US011884897B2

(12) United States Patent
Merritt et al.

(10) Patent No.: US 11,884,897 B2
(45) Date of Patent: Jan. 30, 2024

(54) HARD SURFACE CLEANERS INCLUDING FLUOROSURFACTANTS

(71) Applicant: S. C. Johnson & Son, Inc., Racine, WI (US)

(72) Inventors: Colleen M. Merritt, Racine, WI (US); Loretta G. Lynch, Racine, WI (US)

(73) Assignee: S. C. Johnson & Son, Inc., Racine, WI (US)

(*) Notice: Subject to any disclaimer, the term of this patent is extended or adjusted under 35 U.S.C. 154(b) by 115 days.

(21) Appl. No.: 15/822,283

(22) Filed: Nov. 27, 2017

(65) Prior Publication Data

US 2018/0148667 A1 May 31, 2018

Related U.S. Application Data

(60) Provisional application No. 62/426,672, filed on Nov. 28, 2016.

(51) Int. Cl.

| | |
|---|---|
| ***C11D 1/02*** | (2006.01) |
| ***C11D 3/04*** | (2006.01) |
| ***C11D 3/20*** | (2006.01) |
| ***C11D 3/43*** | (2006.01) |
| ***C11D 1/83*** | (2006.01) |
| ***C11D 17/00*** | (2006.01) |
| ***C11D 3/24*** | (2006.01) |
| ***C11D 11/00*** | (2006.01) |
| ***C11D 1/28*** | (2006.01) |
| ***C11D 1/00*** | (2006.01) |
| ***C11D 3/30*** | (2006.01) |
| *C11D 1/14* | (2006.01) |

(52) U.S. Cl.

CPC ................ *C11D 1/83* (2013.01); *C11D 1/006* (2013.01); *C11D 1/28* (2013.01); *C11D 3/044* (2013.01); *C11D 3/20* (2013.01); *C11D 3/2003* (2013.01); *C11D 3/2006* (2013.01); *C11D 3/2041* (2013.01); *C11D 3/2044* (2013.01); *C11D 3/2068* (2013.01); *C11D 3/245* (2013.01); *C11D 3/30* (2013.01); *C11D 3/43* (2013.01); *C11D 11/0035* (2013.01); *C11D 17/0008* (2013.01); *C11D 1/004* (2013.01); *C11D 1/143* (2013.01)

(58) Field of Classification Search

CPC ........... C11D 1/28; C11D 1/006; C11D 3/044; C11D 3/2041; C11D 3/2044; C11D 3/2003; C11D 3/2006; C11D 3/2068; C11D 3/30; C11D 3/43

USPC ........ 510/238, 427, 432, 435, 499, 505, 506

See application file for complete search history.

(56) References Cited

U.S. PATENT DOCUMENTS

| | | | |
|---|---|---|---|
| 3,463,735 | A | 8/1969 | Stonebraker et al. |
| 3,839,234 | A | 10/1974 | Roscoe |
| 4,213,873 | A | 7/1980 | Church |
| 4,302,348 | A | 11/1981 | Requejo |
| 4,315,828 | A | 2/1982 | Church |
| 4,592,787 | A | 6/1986 | Johnson |
| 5,102,573 | A | 4/1992 | Han et al. |
| 5,108,660 | A | 4/1992 | Michael |
| 5,252,245 | A | 10/1993 | Garabedian, Jr. et al. |
| 5,336,445 | A | 8/1994 | Michael et al. |
| 5,342,549 | A | 8/1994 | Michael |
| 5,415,811 | A | 5/1995 | Wile et al. |
| 5,437,807 | A | 8/1995 | Garabedian, Jr. et al. |
| 5,468,423 | A | 11/1995 | Garabedian, Jr. et al. |
| 5,523,024 | A | 6/1996 | Garabedian, Jr. et al. |
| 5,527,486 | A | 6/1996 | De Guertechin |
| 5,540,864 | A | 7/1996 | Michael |
| 5,540,865 | A | 7/1996 | Michael |
| 5,585,034 | A | 12/1996 | Lysy et al. |
| 5,585,342 | A | 12/1996 | Choy et al. |
| 5,665,268 | A | 9/1997 | DeGuertechin et al. |
| 5,714,448 | A | 2/1998 | Choy et al. |
| 5,750,482 | A | 5/1998 | Cummings |
| 5,817,615 | A | 10/1998 | Garabedian, Jr. et al. |
| 5,849,681 | A | 12/1998 | Neumiller et al. |
| 5,851,981 | A | 12/1998 | Choy et al. |
| 5,876,510 | A | 3/1999 | Kuemin et al. |
| 5,929,007 | A | 7/1999 | Feng |
| 6,136,770 | A | 10/2000 | Cheung et al. |
| 6,194,362 | B1 | 2/2001 | Trinh et al. |
| 6,302,969 | B2 | 10/2001 | Moster et al. |
| 6,306,810 | B1 | 10/2001 | Cheung et al. |
| 6,358,899 | B1 | 3/2002 | Hackett |
| 6,399,553 | B1 | 6/2002 | Cable et al. |

(Continued)

FOREIGN PATENT DOCUMENTS

| | | | |
|---|---|---|---|
| GB | 2166153 | A | 4/1986 |
| JP | 2012121959 | A | 6/2012 |

(Continued)

OTHER PUBLICATIONS

"DuPont Capstone Fluorosurfactants; For High Value-In-Use Applications that Require Maximum Performance", p. 1-8, 2013. (Year: 2013).*

"DuPont Capstone Fluorosurfactant FS-50", p. 1-2, 2012. (Year: 2012).*

PCI Paint & Coatings Industry; "A New Generation of High-Speed Fluorosurfactants, Performance Based on Environmentally Friendly Fluorochemistry", p. 1-6, May 1, 2013. (Year: 2013).*

Merck; "Tivida FL 2300 The High Speed Fluorosurfactant", Product Information, p. 1-6, Nov. 2013. (Year: 2013).*

(Continued)

*Primary Examiner* — Gregory R Delcotto

(57) ABSTRACT

Hard surface, in particular glass, cleaners having an ease in wipe-out while providing good cleaning with a streak-free, glossy shine are described. The cleaner includes at least one fluorosurfactant including a fluorinated functional group with 2 to 6 carbon atoms, and a hydrophilic moiety; at least one non-fluorinated surfactant; a combination of solvents; a combination of cleaning agents; and water.

10 Claims, No Drawings

(56) References Cited

U.S. PATENT DOCUMENTS

| | | | |
|---|---|---|---|
| 6,432,897 | B1 | 8/2002 | Cable |
| 6,440,916 | B1 | 8/2002 | Cheung et al. |
| 6,514,923 | B1 | 2/2003 | Cheung et al. |
| 6,630,434 | B2 | 10/2003 | Besse et al. |
| 6,660,828 | B2 | 12/2003 | Thomas et al. |
| 6,683,036 | B2 | 1/2004 | Foley et al. |
| 6,787,515 | B2 | 9/2004 | Foley et al. |
| 6,881,711 | B1 | 4/2005 | Gershun et al. |
| 7,022,801 | B2 | 4/2006 | Medsker |
| 7,071,155 | B2 | 7/2006 | Griese et al. |
| 7,087,710 | B2 | 8/2006 | Medsker et al. |
| 7,199,090 | B2 | 4/2007 | Koivisto et al. |
| 7,288,514 | B2 | 10/2007 | Scheuing et al. |
| 7,511,008 | B2 | 3/2009 | Scheuing et al. |
| 7,618,930 | B2 | 11/2009 | Diet et al. |
| 7,625,856 | B2 | 12/2009 | Burt et al. |
| 7,683,018 | B2 | 3/2010 | Koivisto et al. |
| 7,700,536 | B2 | 4/2010 | Diet et al. |
| 7,723,279 | B2 | 5/2010 | Lestage et al. |
| 7,790,663 | B2 | 9/2010 | Lestage et al. |
| 8,288,331 | B2 | 10/2012 | Hanai et al. |
| 8,354,364 | B2 | 1/2013 | Lestage et al. |
| 8,476,214 | B2 | 7/2013 | Lynch et al. |
| 8,569,219 | B2 | 10/2013 | Koivisto et al. |
| 8,940,674 | B2 | 1/2015 | Fernandez de Castro et al. |
| 8,951,954 | B2 | 2/2015 | Kron et al. |
| 9,023,782 | B2 | 5/2015 | Peitersen et al. |
| 9,126,889 | B2 | 9/2015 | Nair et al. |
| 2002/0037817 | A1 | 3/2002 | Foley et al. |
| 2002/0037822 | A1 | 3/2002 | Foley et al. |
| 2003/0109662 | A1 | 6/2003 | Medsker et al. |
| 2004/0157763 | A1 | 8/2004 | Foley et al. |
| 2005/0227898 | A1 | 10/2005 | Leskowicz et al. |
| 2005/0233925 | A1 | 10/2005 | Foley et al. |
| 2006/0052264 | A1 | 3/2006 | Lu |
| 2006/0104911 | A1 | 5/2006 | Novak |
| 2006/0104919 | A1 | 5/2006 | Novak |
| 2010/0160453 | A1 | 6/2010 | Koivisto et al. |
| 2013/0065809 | A1 | 3/2013 | Savaglio et al. |
| 2013/0196893 | A1 | 8/2013 | Busby et al. |
| 2015/0170936 | A1 | 6/2015 | Westwood |
| 2015/0203791 | A1 | 7/2015 | Peitersen et al. |
| 2015/0361377 | A1 | 12/2015 | Kron et al. |
| 2016/0023973 | A1 | 1/2016 | Nair et al. |

FOREIGN PATENT DOCUMENTS

| | | | |
|---|---|---|---|
| WO | 9730140 | A1 | 8/1997 |
| WO | 2009105453 | A1 | 8/2009 |

OTHER PUBLICATIONS

Technical Paper Wetting Agents; "High Speed Fluorosurfactants, Excellent balance of product performance and Ecotoxicological impact", Schellenberger et al., p. 1-6, Nov. 2012. (Year: 2012).*

XP-002777639, Technical Brochure, DuPont Capstone Fluorosurfactants, 8 Pages.

XP-002777640, A New Generation of High-Speed Fluorosurfactants, PCI Magazine, May 1, 2013, 7 Pages.

XP-002777641, Technical Brochure, DuPont Capstone FS-65, 2 Pages.

XP-002777642, Technical Brochure, DuPont Capstone FS-10, 2 Pages.

* cited by examiner

HARD SURFACE CLEANERS INCLUDING FLUOROSURFACTANTS

RELATED APPLICATION

The present application claims benefit of U.S. Provisional Application Ser. No. 62/426,672 filed Nov. 28, 2016 entitled "HARD SURFACE CLEANERS INCLUDING FLUOROSURFACTANTS".

FIELD OF INVENTION

Hard surface cleaners, in particular suitable for glass cleaning, having improved wipe-out providing a streak-free and glossy finish, and providing overall enhanced cleaning are described. The ease of wipe-out results in the desired cleaning with less effort.

BACKGROUND OF THE INVENTION

Hard surface cleaners, especially those useful in cleaning glass, are generally composed of significant amounts of surfactants and solvents to provide for cleaning and evaporation off of a surface to which it has been applied. Typical cleaners, especially if foaming or sudsing is involved, can be perceived as requiring more work in wiping and removal due to less ease in the wiping off of the surface to which the cleaner was applied.

Accordingly, a hard surface cleaner which provides a desired level of cleaning while needing less effort and time to wipe the cleaner from a treated surface and leaves the surface streak-free and with good gloss is desirable, especially for glass surface cleaning.

SUMMARY OF THE INVENTION

A hard surface cleaner is provided having improved wipeout, i.e., ease of wiping, while also providing a desired level of cleaning resulting in a streak-free, glossy and clean surface. The hard surface cleaner is especially useful for cleaning glass and other reflective surfaces due to the absence of residue, haze or film on the surface following wipe-out.

The hard surface cleaner of the invention includes at least one fluorosurfactant and a decreased amount of solvents while retaining a high level of evaporation and cleaning.

More particularly, the hard surface cleaner includes a combination of solvents, a combination of cleaning agents, at least one solubilizer, at least one non-fluorinated surfactant, at least one fluorinated surfactant, and water.

Preferably, the hard surface cleaner includes a combination of solvents, a combination of the cleaning agents, at least one solubilizer, at least one non-fluorinated anionic sulfur-containing surfactant, at least one fluorinated surfactant including in the fluorinated functional group 2 to 6 carbon atoms, and water.

The preferred solvents assist in evaporation of the cleaner during the cleaning process. Examples of solvents suitable for use include $C_1$-$C_6$ alkanols and alkylene glycol $C_1$-$C_6$ alkyl ethers.

Preferred non-fluorinated surfactants or emulsifiers include anionic salts of an alkane sulfonate, and nonionic secondary alcohol ethoxylates. A benefit achieved with the cleaner composition of the invention, is that desired cleaning results can be obtained through the inclusion of one non-fluorinated surfactant and one fluorosurfactant. For a majority of surfactants, the inclusion of more than one surfactant results in the creation of a residue that adheres to the surface being cleaned during the wiping step, and is especially noticeable with glass, or creates foam, which in each case is seen by the user as requiring more work or effort to remove from the surface. The preferred surfactant for inclusion, thus, is a single surfactant having the ability to emulsify greasy soil and glide off the surface being cleaned easily and without leaving behind a residual haze.

The one or more fluorosurfactants provide modification to a surface treated with a cleaner containing the fluorosurfactant(s) so as to improve gloss and aid in the overall wipe-out experience. Without being limited thereto, it is believed that the fluorosurfactant in combination with a decreased amount of solvent and suitable emulsifier(s) serves to provide good cleaning with less effort in wiping the cleaner from the treated surface. More preferred fluorosurfactants include a fluorinated carbon functionality having 2 to 6 carbons, wherein the carbons are present as a single linear group or are present as a plurality of branched short chain groups wherein the total number of carbons of the branched groups does not exceed 6 carbons.

One preferred embodiment of a hard surface cleaner of the invention comprises (a) at least one fluorinated surfactant including a fluorine-containing moiety and a hydrophilic moiety, wherein the fluorine-containing moiety comprises a fluorinated functional group having 2 to 6 carbon atoms; (b) a plurality of solvents including at least one $C_1$-$C_3$ alkanol, and at least one ethylene glycol $C_{1-6}$ alkyl ether and propylene glycol 01-6 alkyl ether; (c) a plurality of cleaning agents including at least one alkanolamine, and at least one hydroxide; (d) at least one non-fluorinated surfactant; and (e) an aqueous-based diluent. The cleaner also preferably includes a solubilizer, which more preferably is an alkylene glycol, and most preferably is a $C_{1-3}$ alkylene glycol.

Further, the above preferred embodiment preferably includes the components as follows: greater than 0 to about 5 wt. % of the fluorinated surfactant, greater than 0 to about 7 wt. % of the alkanol, about 0.1 to about 6 wt. % of the ethylene glycol $C_{1-6}$ alkyl ether, greater than 0 to about 5 wt. % of the propylene glycol $C_{1-6}$ alkyl ether, greater than 0 to about 6 wt. % of the alkanolamine, greater than 0 to about 5 wt. % of the hydroxide, greater than 0 to about 5 wt. % of the non-fluorinated surfactant, and a balance to 100 wt. % of the aqueous-based carrier. When a solubilizer is included, the solubilizer is present in an amount of greater than 0 to about 5 wt. %.

Another more preferred embodiment of a hard surface cleaner of the invention comprises a fluorinated surfactant including a fluorinated functional group having $C_2$-$C_6$ linear or branched carbon atoms; isopropanol; propylene glycol propyl ether; ethylene glycol hexyl ether; isopropanolamine; ammonium hydroxide; alkali metal alkane sulfonate; and water. Further, this preferred embodiment more preferably includes the components as follows: about 0.001 to about 0.5 wt. % of the fluorinated surfactant, about 1.5 to about 2.5 wt. % isopropanol, about 0.1 to about 1 wt. % propylene glycol propyl ether, about 0.1 to about 2 wt. % ethylene glycol hexyl ether, about 0.01 to about 2 wt. % isopropanolamine, about 0.01 to about 1 wt. % ammonium hydroxide, about 0.1 to about 2 wt. % alkali metal alkane sulfonate, and a balance to 100 wt. % of water. More preferably this embodiment further includes propylene glycol and, more preferably the propylene glycol is included in an amount of about 0.1 to about 1 wt. %.

DETAILED DESCRIPTION OF THE INVENTION

Hard surface cleaners, in particular glass cleaners, have been known to include various solvent and surfactant combinations. However, in order to obtain the desired cleaning with good wipe-out which provides gloss and shine to a surface, such cleaners included ingredients which resulted in a high volatile organic content (VOC) and toxicity to the environment and/or were accumulated in living organisms (plants and/or animals). Accordingly, it is desirable to provide a hard surface cleaner having the same or better cleaning and wipe-out with a low to zero VOC, non-toxicity, and no bio-accumulation. The present invention provides such a cleaner based on a unique combination of ingredients. The cleaner of the invention provides for improved glide (i.e., reduced drag) across a hard surface, in particular glass, to allow for ease in wiping and enhancement in overall performance.

The cleaner of the invention includes a combination of solvents, a combination of cleaning aids, at least one non-fluorinated surfactant, at least one fluorinated surfactant, and an aqueous-based carrier or diluent, preferably water. The cleaner preferably has a VOC of 3% or less. Further, the cleaner preferably includes at least one solubilizing aid, a colorant or dye, and fragrance.

The at least one fluorinated surfactant serves as a surface modifier which improves the gloss and aids in improving the glide across the surface being treated, i.e., the wipe-out, which then enhances the overall performance of the cleaner, e.g., soil removal and non-streaking. The fluorinated surfactant(s) lower(s) the surface tension of the cleaner composition which aids in the ease of wiping.

Fluorinated surfactants suitable for use in the cleaner of the invention are compounds including a fluorinated carbon functional group and a hydrophilic functional group. The fluorinated carbon functional group includes 2 to 6 carbon atoms, wherein the carbons are present as a single linear group or are present as a plurality of branched short chain groups where the total number of carbons of the branched groups does not exceed 6 carbons. Preferred fluorinated surfactants for inclusion in the cleaner of the invention are anionic, nonionic or amphoteric.

Examples of fluorinated surfactants suitable for use including a short linear chain fluorinated functional group of $F(CF_2)_n^-$ where n=6 or less, and hydrophilic group. Such fluorinated surfactants are sold under the trade name CAPSTONE by DuPont and have a formula $F(CF_2)_nCH_2CH_2^-$ where n=6 or shorter. Particular CAPSTONE fluorosurfactants suitable for use are CAPSTONE FS-50 which is amphoteric, CAPSTONE FS-60 which is anionic, and CAPSTONE FS-65 which is nonionic. Each of these are also identified by the manufacturer as being alkyl phenol exthoxylate (APEO)-free.

Examples of fluorinated surfactants suitable for use including branched short chain fluorinated functional groups attached to a hydrophilic moiety are sold under the trade name TIVIDA FL by EMD. TIVIDA FL compounds include three short chain carbon groups where each group is 2 carbons in length, i.e., $(C_2F_5)_3$.hydrophilic moiety. TIVIDA compounds particularly suitable for use are TIVIDA FL 2300 and TIVIDA FL 2500.

The use of a single fluorinated surfactant has been found suitable for inclusion in the hard surface cleaner of the invention, but a combination of fluorinated surfactants can also be used. Individual fluorosurfactants, in addition to providing the contributions described above, may have other properties or characteristics that contribute to different consumer preferred attributes for the cleaner and, thus, if different attributes are desired to be enhanced different fluorosurfactants may be combined to achieve the desired effect.

The fluorinated surfactant(s) preferably are included in the cleaner of the invention in an amount in a range greater than 0 to about 5 wt. %, more preferably in an amount of about 0.001 to about 0.5 wt. %, and most preferably in a range of about 0.01 to about 0.4 wt. %.

The combination of solvents included in the cleaner of the invention preferably is a combination of at least one short chain (i.e., $C_1$-$C_6$) alkanol and one or more alkylene glycol $C_1$-$C_6$ alkyl ether, more preferably a $C_1$-$C_6$ alkanol and two alkylene glycol $C_1$-$C_6$ alkyl ethers. A most preferred combination is isopropyl alcohol, propylene glycol n-propyl ether, and ethylene glycol n-hexyl ether.

The alkanol solvent aids in the evaporation of the cleaner during the cleaning and wiping out of the cleaner. The $C_1$-$C_6$ alkanol is included in an amount in a range of greater than 0 to about 7 wt. %, more preferably about 1.5 to about 2.5 wt. %, and most preferably about 1.9 to about 2.1 wt. %.

The alkylene glycol solvent aids in the drying and evaporation of any residue during and/or after wiping out of the cleaner from a treated surface. The at least one alkylene glycol $C_1$-$C_6$ alkyl ether is preferably included in an amount of about 0.01 to 6 wt. %, more preferably about 0.1 to about 2 wt. %, and most preferably about 0.5 to about 1 wt. %. For a combination of a propylene glycol alkyl ether and an ethylene glycol alkyl ether, the amounts for the propylene glycol alkyl ether preferably are greater than 0 to about 5 wt. %, more preferably about 0.01 to about 1 wt. %, and most preferably about 0.15 to about 0.35 wt. %, and the amount for the ethylene glycol alkyl ether preferably is greater than 0 to about 5 wt. %, more preferably about 0.01 to about 1 wt. %, and most preferably about 0.3 to about 0.5 wt. %

The non-fluorinated surfactant is selected based on its ability to emulsify greasy soil and to enhance the ease of glide off of the cleaner from a treated surface without leaving behind a hazy residue. A majority of surfactants create a residue that quickly adheres to a treated surface, especially glass, during the wiping step of the cleaning process or creates foam during cleaning. Each of these characteristics interferes with the wiping out of the cleaner by a consumer during use of the cleaner, in particular as requiring more effort or work to remove the cleaner from the surface. Preferred non-fluorinated surfactants suitable for inclusion in the cleaner of the invention include anionic alkane or aromatic sulfonates or sulfates, more preferably anionic alkane sulfonates. A preferred non-fluorinated anionic surfactant suitable for use is sold under the trade name BIO-TERGE PAS-8S by Stepan which is sodium caprylyl sulfonate. Other non-fluorinated anionic surfactants useful in the cleaner include sodium dodecyl benzene sulfonate and sodium lauryl sulfate. Further preferred non-fluorinated surfactants suitable for inclusion in the cleaner of the invention include nonionic surfactants, such as secondary alcohol ethoxylates. Examples of preferred secondary alcohol ethoxylates are sold under the trade name TERGITOL by The Dow Chemical Co., more preferably TERGITOL 15-S-7 (also known as $C_{11-15}$ Pareth-7) and TERGITOL 15-S-12 (also known as $C_{11-15}$ Pareth-12).

The non-fluorinated surfactant is preferably present in an amount in a range of greater than 0 to about 5 wt. %, more preferably about 0.01 to about 2 wt. %, and most preferably about 0.1 to about 0.4 wt. %.

The preferred combination of cleaning agents included in the hard surface cleaner are selected from alkanolamines and hydroxides. More preferably, the combination of cleaning agents is one alkanolamine and one hydroxide compound.

Alkanolamines suitable for use include mono- and di-alkanolamines, wherein the alkanol has a $C_1$ to $C_3$ carbon chain. A preferred alkanolamine is monoisopropanolamine (MIPA). The alkanolamine is preferably included in the cleaner in an amount in a range of greater than 0 to about 6 wt. %, more preferably about 0.01 to about 2 wt. %, and Most preferably about 0.4 to about 0.6 wt. %.

The hydroxide serves as an alkaline source to aid in soil removal. Hydroxides suitable for use include ammonium hydroxide, sodium hydroxide and potassium hydroxide. The more preferred is ammonium hydroxide. The hydroxide is preferably present in an amount greater than 0 to about 5 wt. %, more preferably about 0.01 to about 1 wt. %, and most preferably about 0.2 to about 0.4 wt. %.

The cleaner preferably also includes a solubilizer. The solubilizer is included to serve as a humectant in the dry down phase of the cleaner to provide a continuous film in various humidities. Preferred solubilizers suitable for use in the cleaner of the invention are short chain (i.e., $C_{1-3}$) glycols. A more preferred solubilizer is propylene glycol. The solubilizer is preferably included in an amount in a range of greater than 0 to about 5 wt. %, more preferably about 0.1 to about 1 wt. %, and most preferably about 0.3 to about 0.4 wt. %.

Adjuvants which are optional, but which are preferably included, are a fragrance and a colorant or dye.

A "fragrance" is to be understood as meaning both a single fragrant or perfume compound and a blend of fragrant or perfume compounds. The fragrance is preferably included in the cleaner of the invention in an amount in a range of 0 to about 1 wt. %, more preferably about 0.001 to about 0.5 wt. %, and most preferably about 0.1 to about 0.4 wt. %.

The colorant or dye is visually present in solution and is preferably included in an amount from 0 to about 1 wt. %, more preferably in an amount of about 0.001 to about 0.1 wt. %, and most preferably in an amount of about 0.005 to about 0.009 wt. %.

The cleaner of the invention also includes an aqueous-based diluent or carrier. The preferred diluent/carrier is water, more preferably soft water, deionized water, reverse osmosis water and the like. The more preferred water for inclusion in the cleaner is soft water. The diluent/carrier is present in an amount to provide the wt. % balance of the cleaner to 100 wt. %.

An example of a preferred glass cleaner formulation according to the invention is set forth in Table 1 below.

TABLE 1

| INGREDIENTS | WT. % |
|---|---|
| Soft Water | 96.0326 |
| Isopropanol | 2.0 |
| Propylene Glycol n-Propyl Ether | 0.25 |
| Hexyl Cellosolve | 0.4 |
| Propylene Glycol | 0.2 |
| Monoisopropanolamine (99%) | 0.5 |
| Ammonium Hydroxide (30%) | 0.3 |
| Sodium Caprylyl Sulfonate | 0.26 |
| Fragrance (no solubilizer) | 0.025 |
| Dye | 0.0074 |
| Fluorosurfactant | 0.025 |
| TOTAL | 100% |
| VOC = 2.5% | |

The fluorosurfactant in the amount included in the glass cleaner formulation set forth in Table 1 can be any of CAPSTONE FS-50, CAPSTONE FS-60, CAPSTONE FS-65, TIVIDA FL 2300 and TIVIDA FL 2500.

A. Comparative Testing

The preferred glass cleaner set forth in Table 1 above was compared against a commercially available glass cleaner having a formula as set forth in Table 2 below.

TABLE 2

| INGREDIENTS | WT. % |
|---|---|
| Soft Water | 98.6626 |
| Hexyl Cellosolve | 0.5 |
| Monoisopropanolamine | 0.2 |
| Sodium Dodecyl Benzene Sulfonate | 0.2 |
| Lauryl Dimethyl Amine Oxide | 0.1 |
| Ammonium Hydroxide | 0.3 |
| Fragrance | 0.03 |
| Dye | 0.0074 |
| TOTAL | 100% |
| VOC = 0.2% | |

(1) Machine Tests

A machine was used to wipe out three cleaners identically applied to the same glass surface. The machine measured the wipe out performance and soil removal. Cleaner I is the cleaner of Table 1 containing CAPSTONE FS-50, Cleaner II is the cleaner of Table 1 containing TIVIDA FL 2500 and Cleaner III is the cleaner of Table 2 which does not include a fluorosurfactant.

Machine Test Results:

(a) Streak test

Rating Scale:

0=No Streaks

5=Totally Streaked (i) Cleaner I=0.38

(ii) Cleaner II=0.38

(iii) Cleaner III=0.75

(b) Soil Removal Test

Rating Scale:

0=All Soil Removed

5=No Soil Removed (i) Cleaner I=3.78

(ii) Cleaner II=3.86

(iii) Cleaner III=2.35

(2) Hands on Tests

People were used to manually perform the application of the glass cleaners by spraying the cleaner using an identical pump dispenser on an identical glass surface and the wiping action to clean and wipe off the cleaner from the surface. Cleaners I, II and III as described above in relation to the "Machine Tests" were also used in the "Hands On Tests".

Hands on Test Results:

(a) Streak Test Under Low Light Environment (Afternoon Sun Simulation)

Rating Scale:

0=No Streaks

5=Totally Streaked (i) Cleaner I=0.85

(ii) Cleaner II=1.85

(iii) Cleaner III=2.6

(b) Overall Cleaner Performance Under Low Light Environment (Afternoon Sun Simulation)

Rating Scale:

0=Completely Acceptable

5=Not At All Acceptable (i) Cleaner I=1.4

(ii) Cleaner II=2.15

(iii) Cleaner III=2.8

(c) Streak Test Under High Light Environment (Direct Sunlight, Mid-Day Simulation)

Rating Scale:

0=No Streaks

5=Totally Streaked (i) Cleaner I=0.9

(ii) Cleaner II=1.7

(iii) Cleaner III=3.15

(d) Overall Cleaner Performance Under High Light Environment (Direct Sunlight, Mid-Day Simulation)

Rating Scale:

0=Completely Acceptable

5=Not At All Acceptable (i) Cleaner I=1.8

(ii) Cleaner II=2.2

(iii) Cleaner III=3.85

(e) Glide Test (Amount of Drag)

Rating Scale:

0=Glides Easily

5=Sticks (i) Cleaner I=1.55

(ii) Cleaner II=1.2

(iii) Cleaner III=0.45

(f) Ease of Cleaning Test

Rating Scale:

0=Effortless

5=Tough (i) Cleaner I=1.7

(ii) Cleaner II=1.7

(iii) Cleaner III=1.85

(3) Performance Summary

| Performance | Cleaner I v. Cleaner III | Cleaner II v. Cleaner III |
|---|---|---|
| Overall Performance (% Prefer) | 61% v. 39% | 57% v. 43% |
| Removes Fingerprints, Smudges and Smears (% Prefer) | 55% v. 45% | 58% v. 42% |
| Does not leave a residue or streaks (% Prefer) | 58% v. 42% | 60% v. 40% |
| Leaves a Surface Shiny (% Prefer) | 56% v. 44% | 58% v. 42% |
| Other Performance Advantages of Cleaner I/Cleaner II over Cleaner III | Streak-free shine; less wiping; overall smell; overall cleaning; no residual haze; dries quickly while wiping; easy spray control | Cleaning non-glass surfaces with less wiping and streak-free shine |

Both Cleaners I and II show advantage in cleaning with less wiping and good overall performance, and is preferred for a streak-free shine.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

The invention claimed is:

1. A hard surface cleaner consisting of (a) about 0.001 to about 0.5 wt. % of at least one fluorinated surfactant having a fluorine-containing moiety having a formula of either linear or branched (1) $F(CF_2)_n$ where "n" is 2-6 or (2) $(C_2F_5)_3$, and a hydrophilic moiety;

(b) a plurality of solvents of greater than 0 to about 7 wt. % of at least one $C_1$-$C_3$ alkanol, greater than 0 to about 5 wt. % of at least one ethylene glycol $C_{1-6}$ alkyl ether, and greater than 0 to about 5 wt. % of at least one propylene glycol $C_{1-6}$ alkyl ether;

(c) a plurality of cleaning agents of greater than 0 to about 6 wt. % of at least one mono- or di-alkanolamine having a $C_{1-3}$ carbon chain, and greater than 0 to about 5 wt. % of at least one ammonium, sodium or potassium hydroxide;

(d) greater than 0 to about 5 wt. % of at least one anionic alkane or aromatic sulfonate or sulfate;

(e) a balance to 100% of water;

(f) optionally, a solubilizer; and (g) optionally, a fragrance and/or colorant;

wherein said cleaner has a volatile organic content (VOC) of 3 or less, and is able to remove greasy soil and be removed from a surface treated with the cleaner without leaving a residual haze on the surface.

2. The hard surface cleaner of claim 1 wherein the fluorine-containing moiety is a $C_2$-$C_6$ linear chain fluorinated functional group.

3. The hard surface cleaner of claim 1 wherein the fluorine-containing moiety is a $C_2$-$C_6$ branched chain fluorinated functional group.

4. The hard surface cleaner of claim 1 wherein said plurality of solvents are propanol, ethylene glycol hexyl ether, and propylene glycol propyl ether.

5. The hard surface cleaner of claim 1 wherein the plurality of cleaning agents are isopropanolamine and ammonium hydroxide.

6. The hard surface cleaner of claim 1 wherein said solubilizer is an alkylene glycol.

7. The hard surface cleaner of claim 1 wherein said solubilizer is propylene glycol.

8. The hard surface cleaner of claim 1 wherein said anionic alkane or aromatic sulfonate or sulfate is an alkali metal alkane sulfonate.

9. The hard surface cleaner of claim 1 wherein said cleaner comprises about 0.01 to about 0.4 wt. % of said fluorinated surfactant, about 1.5 to about 2.5 wt. % of said alkanol, about 0.01 to about 1 wt. % of said ethylene glycol $C_{1-6}$ alkyl ether, about 0.01 to about 1 wt. % of said propylene glycol $C_{1-6}$ alkyl ether, about 0.01 to about 2 wt. % of said mono- or di-alkanolamine, about 0.01 to about 1 wt. % of said hydroxide, about 0.01 to about 2 wt. % of said anionic alkane or aromatic sulfonate or sulfate, and a balance to 100 wt. % of said water.

10. A hard surface cleaner consisting of about 0.01 to about 0.4 wt. % of a fluorinated surfactant having a fluorinated functional group having linear or branched carbon atoms and a formula of either (1) $F(CF_2)_n$ where "n" is 2-6 or (2) $(C_2F_5)_3$;

about 1.9 to about 2.1 wt. % of isopropanol;

about 0.15 to about 0.35 wt. % of propylene glycol propyl ether;

about 0.3 to about 0.5 wt. % of ethylene glycol hexyl ether;

about 0.4 to about 0.6 wt. % of isopropanolamine;

about 0.2 to about 0.4 wt. % of ammonium hydroxide;

about 0.1 to about 0.4 wt. % of alkali metal alkane sulfonate;

a balance to 100 wt. % of water; and optionally, one or more of a solubilizer, fragrance and colorant;

wherein said cleaner has a volatile organic content (VOC) of 3 or less, and is able to remove greasy soil and be removed from a surface treated with the cleaner without leaving behind a residual haze on the surface.

* * * * *